No. 742,286. PATENTED OCT. 27, 1903.
G. A. BULLES.
TAIL WRAPPER AND CRUPPER FOR HORSE BLANKETS.
APPLICATION FILED SEPT. 6, 1902.
NO MODEL.

WITNESSES
INVENTOR
George A. Bulles
BY
Frederick Benjamin
ATTORNEY.

No. 742,286.

Patented October 27, 1903.

UNITED STATES PATENT OFFICE.

GEORGE A. BULLES, OF AURORA, ILLINOIS.

TAIL WRAPPER AND CRUPPER FOR HORSE-BLANKETS.

SPECIFICATION forming part of Letters Patent No. 742,286, dated October 27, 1903.

Application filed September 6, 1902. Serial No. 122,438. (No model.)

*To all whom it may concern:*

Be it known that I, GEORGE A. BULLES, a citizen of the United States, residing at Aurora, in the county of Kane and State of Illinois, have invented certain new and useful Improvements in Tail Wrappers and Cruppers for Horse-Blankets, of which the following is a specification.

My invention relates to improvements in means for attaching a horse-blanket or the like to the animal's tail and for wrapping the upper portion of the tail to protect it against rubbing while the animal is in the stall or while being transported from one place to another in an ordinary stock-car.

A portion of my improved device may be used, if desired, in combination with a simple form of crupper-strap without the tail-wrapping element.

One of the chief objects of my improved device is to hold the rear portion of a horse-blanket snugly and securely to the animal's rump in a manner that will permit the rear edge of the blanket to overhang the animal's tail.

A further object is to remove the strain resulting from the movements of the horse from the rear edge of the blanket, where it commonly applies in the blankets in use, to a point considerably forward from such rear edge, where there is an abundance of material to withstand such strain.

A still further object is to provide a yielding attachment for the tail-holding device or crupper-strap, thus in a measure relieving the strain on the blanket fabric or material.

Having the foregoing and other objects of general utility in view I have designed the combined tail-wrapper and crupper-strap hereinafter described, and which is illustrated in the accompanying drawings, in which—

Figure 1:
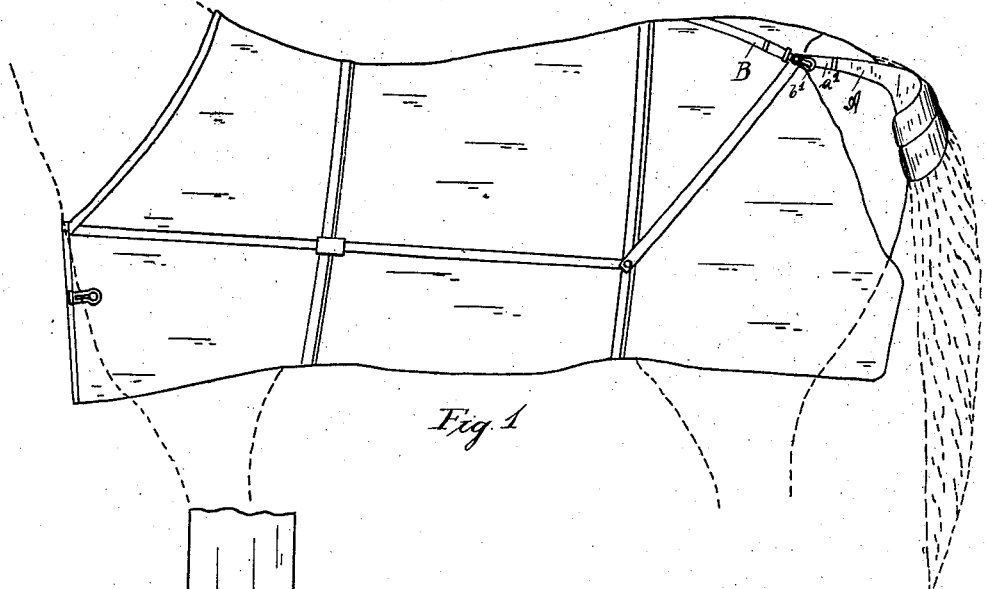
Figure 3:
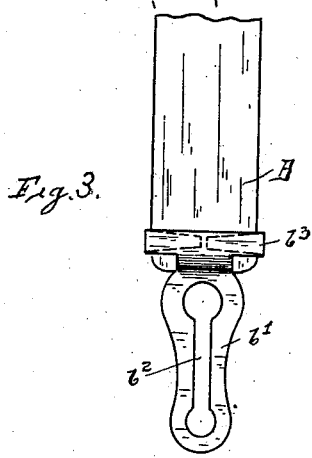
Figure 2:
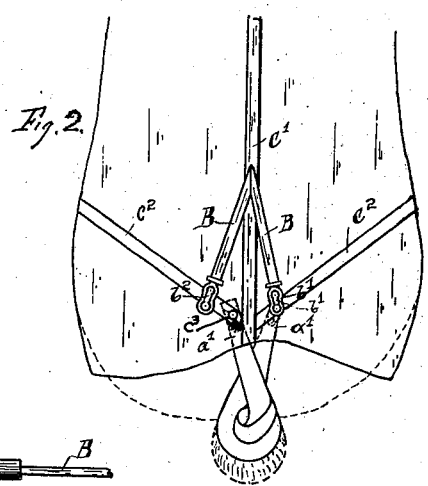
Figure 4:
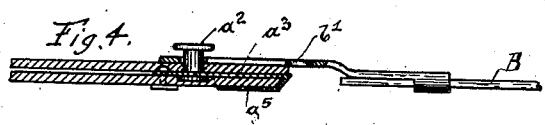
Figure 5:
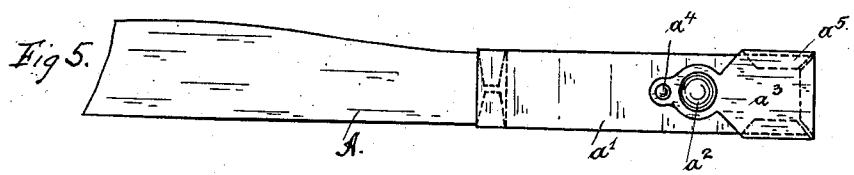

Figure 1 is a view, partly in side elevation and partly sectional, showing my invention as applied to a horse-blanket of common form. Fig. 2 is a top plan view showing the rear portion of a blanket fitted with my invention, a portion of the blanket being removed to more clearly exhibit the wrapping device. Fig. 3 is a detail, on an enlarged scale, showing one element of the catch which is used to attach the tail-wrapper to the blanket. Fig. 4 is a sectional view of the crupper-attaching means, and Fig. 5 is a top plan view of the element shown in Fig. 4.

Referring to the drawings in their various details, A represents my novel form of tail-wrapper, which is formed of any suitable material—such as cloth, canvas, or the like—tapering at each end and having secured at such ends short sections of elastic webbing $a'$, to which is secured one element of the catch. This element is composed of a piece of thin flat metal $a^2$, having its ends and sides $a^5$ bent around and embracing the outer end of the webbing and having secured thereto a stud $a^3$ and being riveted to the webbing by a rivet $a^4$.

B B represent two elastic-webbing straps, which are stitched at one end to the back-strap $c'$ of the blanket C at a point considerably forward of the rear edge of the blanket and extend rearwardly on divergent lines. To the free ends of these straps are attached the companion element to that described, which forms the catch. This element is composed of a piece of substantially flat metal cut to form a projecting tongue $b'$, in which is cut a keyhole-slot $b^2$, and to form branches $b^3$, which are bent around and closely embrace the end of the strap B, to which they are secured in any suitable manner, as by stitching the end of the strap over said branches. The keyhole-slot is adapted to engage the stud $a^2$ when the two elements are connected in the manner shown.

To the outer face of the blanket are stitched straps $c^2$, which start at the back-strap $c'$ and extend forwardly and downwardly. Through these straps at points equidistant on each side of the back-strap $c'$ gromets $c^3$ are placed, the openings in which are adapted to receive the studs $a^2$ on the crupper-strap or wrapper A. These gromets are so positioned that it is necessary to slightly stretch the straps B to bring the keyhole $b^2$ over same. The stud $a^2$ on one end of the wrapper A is inserted through one of the gromets and the wrapper carried around the animal's tail with as many wraps as its length will permit and leave the free end to make connection with the gromet on the opposite side of the back-strap. It will be understood that the tail-wrapper is at all times below the blanket and the straps are on the outer side, the connection between the two being limited to the points at which the gromets are placed.

It will be apparent that my invention may be applied to any form of blanket by simply inserting gromets at points on opposite sides of the back seam.

Having thus described my invention, what I claim as new, and desire to secure by Letters Patent, is—

1. In combination with a horse-blanket or the like having suitable openings therein, of a tail-wrapping device adapted to be wound about the animal's tail, and to have its ends detachably secured in said openings, substantially as set forth.

2. In combination with a horse-blanket or the like, having suitable openings therein, of an extensible tail-wrapping device adapted to be wound about the animal's tail, and to have its ends detachably secured in said openings, substantially as set forth.

3. In combination with a horse-blanket or the like having openings near its rear end and on opposite sides of the median line, a tail-wrapping device adapted to have its respective ends engage said openings, and elastic means for securing said ends detachably in said openings.

4. In combination with a horse-blanket or the like having openings near its rear edge, a tail-wrapping device applied to the under side of the blanket and having portions projecting through said openings, and means attached to the upper side of the blanket, whereby said portions are detachably secured in said openings.

In testimony whereof I affix my signature in presence of two witnesses.

GEORGE A. BULLES.

Witnesses:
  MORTON C. LONG,
  F. BENJAMIN.